United States Patent
Zhang et al.

(10) Patent No.: US 12,530,451 B2
(45) Date of Patent: Jan. 20, 2026

(54) SECURITY CALCULATION METHOD AND SYSTEM FOR SIDE CHANNEL RESISTANCE BASED ON DATA MARKING

(71) Applicant: Nanhu Laboratory, Jiaxing (CN)

(72) Inventors: Lei Zhang, Jiaxing (CN); Zedong Wang, Jiaxing (CN)

(73) Assignee: Nanhu Laboratory, Jiaxing (CN)

( * ) Notice: Subject to any disclaimer, the term of this patent is extended or adjusted under 35 U.S.C. 154(b) by 0 days.

(21) Appl. No.: 19/180,193

(22) Filed: Apr. 16, 2025

(65) Prior Publication Data
US 2025/0322067 A1    Oct. 16, 2025

(30) Foreign Application Priority Data
Apr. 16, 2024  (CN) .......................... 202410453684.4

(51) Int. Cl.
G06F 21/55 (2013.01)

(52) U.S. Cl.
CPC ...... G06F 21/554 (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,887,152 A * | 3/1999 | Tran | G06F 9/3812 712/E9.046 |
| 6,711,671 B1 * | 3/2004 | Undy | G06F 9/3842 712/225 |
| 10,243,990 B1 * | 3/2019 | Chen | G06F 21/57 |
| 10,394,716 B1 * | 8/2019 | Piry | G06F 12/0871 |
| 10,970,390 B2 * | 4/2021 | McKeen | G06F 12/145 |
| 11,263,015 B1 * | 3/2022 | Mukherjee | G06F 9/3851 |
| 11,604,873 B1 * | 3/2023 | Mukherjee | G06F 21/566 |
| 11,630,920 B2 * | 4/2023 | Durham | H04L 9/002 713/189 |
| 12,008,370 B2 * | 6/2024 | Thottethodi | G06F 9/3842 |
| 2019/0065405 A1 * | 2/2019 | Gotze | G06F 12/1408 |
| 2020/0364154 A1 * | 11/2020 | Lee | G06F 21/554 |
| 2020/0372129 A1 * | 11/2020 | Gupta | G06F 21/52 |

(Continued)

OTHER PUBLICATIONS

Fustos et al., SpectreGuard: An Efficient Data-centric Defense Mechanism against Spectre Attacks, 2019, ACM, 6 Pages total (Year: 2019).*

*Primary Examiner* — Christopher C Harris
(74) *Attorney, Agent, or Firm* — Bayramoglu Law Offices LLC

(57) ABSTRACT

A security calculation method and system for side channel resistance based on data marking is used to defend against a microarchitectural side-channel attack (SCA), particularly a transient-execution attack. The method is data-centric, and based on data marking. Through the data marking (page table entry (PTE) marking and instruction marking), and a delayed update mechanism dependent on the data marking, the method ensures that any subsequent instructions dependent on a memory-sensitive instruction are not executed in speculative execution, thereby preventing confidential data from being leaked when a conditional branch outcome is unknown, effectively resisting the SCA, improving the security, and minimizing the impact on central processing unit (CPU) performance.

13 Claims, 2 Drawing Sheets

(56) References Cited

U.S. PATENT DOCUMENTS

| | | | |
|---|---|---|---|
| 2021/0073131 A1* | 3/2021 | Krueger | G06F 12/109 |
| 2021/0173651 A1* | 6/2021 | Mukherjee | G06F 9/3851 |
| 2021/0173657 A1* | 6/2021 | Mukherjee | G06F 9/3836 |
| 2022/0050909 A1* | 2/2022 | Reid | G06F 9/3842 |
| 2023/0141935 A1* | 5/2023 | Wang | G06F 9/3842 |
| | | | 712/220 |
| 2024/0211412 A1* | 6/2024 | Masters | G06F 11/1435 |
| 2025/0068732 A1* | 2/2025 | Briongos | G06F 21/554 |

* cited by examiner

SECURITY CALCULATION METHOD AND SYSTEM FOR SIDE CHANNEL RESISTANCE BASED ON DATA MARKING

CROSS REFERENCE TO THE RELATED APPLICATIONS

This application is based upon and claims priority to Chinese Patent Application No. 202410453684.4, filed on Apr. 16, 2024, the entire contents of which are incorporated herein by reference.

TECHNICAL FIELD

The present disclosure belongs to the technical field of security calculation, and in particular to a security calculation method and system for side channel resistance based on data marking.

BACKGROUND

With the continuous advancement of technologies, a new type of side-channel attacks (SCAs) against modern computer architectures are emerging constantly, and developing rapidly. This type of SCAs, represented by transient-execution attacks, mainly make use of some optimization characteristics of modern computers at the microarchitectural level, such as speculative execution, out-of-order execution, and buffer optimization. These characteristics greatly improve performance of the computers, but they also introduce some hidden side effects at the microscopic operation level, such as unauthorized access of transient instructions, and covert channels. By leveraging these side effects with crafted software design, attackers can exfiltrate sensitive data generated at the microscopic level to cause serious private data leakage. According to the research, the new type of SCAs come at low cost and easy implementation. On all mainstream chip architectures including Intel, AMD, and ARM, exploitable vulnerabilities of different levels have been identified, posing a serious threat to data security.

Till now, several software-based or hardware-based mitigation strategies have been proposed. The software-based mitigation strategies prevent speculative execution by manually inserting a serializing instruction or introducing an additional data dependency between a conditional jump instruction and a subsequent memory load instruction. However, manual identification on potential vulnerable branches in programs is achieved hardly, while compiler-automated protection for all branches incurs excessive performance overhead. The hardware-based methods typically focus on obscuring attacker-observable microarchitectural status changes by introducing additional hardware structures. Although codes are not modified manually, hardware modification is highly intrusive with huge performance overhead.

SUMMARY

In view of the above problems, an objective of the present disclosure is to provide a new method and system, namely a security calculation method and system for side channel resistance based on data marking, to defend against a microarchitectural SCA, particularly a transient-execution attack. The method is data-centric, and based on data marking. By identifying a sensitive memory block containing confidential data, marking the sensitive memory block as a confidential memory region, and utilizing low-cost security extension of a hardware layer, the method can effectively prevent the microarchitectural SCA, and minimize impact on operation performance of the computer.

A security calculation method for side channel resistance based on data marking includes:
executing a memory-safe function in response to a memory-safe function call carrying a pass parameter, the pass parameter including an address of a variable containing confidential data;
detecting a memory block of confidential data through the pass parameter, and marking, with a flag SF of a page table entry (PTE) corresponding to the memory block, the corresponding memory block as a sensitive memory block;
marking an instruction for marking a page of a target address as the sensitive memory block as a memory-sensitive instruction in a reorder buffer (ROB), specifically, marking an instruction for marking a memory block corresponding to a PTE of the target address as the sensitive memory block as the memory-sensitive instruction in the ROB; and
when the memory-sensitive instruction is executed completely and is an oldest instruction in the ROB, updating a complete status to a scoreboard, ensuring that a subsequent potential threat instruction is not subjected to speculative execution.

The ROB is a key component for recording an instruction execution order and an instruction execution status. It allows out-of-order execution of a central processing unit (CPU). That is, instructions may not be executed according to their original order in a program, and their execution order is optimized according to resource availabilities and dependency relationships. The out-of-order execution can improve performance, but may also introduce SCAs, because sensitive operations may be executed before a conditional branch outcome is known.

The scoreboard is used to process dependency relationships between instructions, and determine which subsequent instructions can be dispatched for execution. Normally, once the instruction is completed, its status update is immediately notified to the scoreboard, allowing subsequent instructions dependent on the instruction for execution, namely the speculative execution, when the conditional branch outcome is unknown.

The status update is delayed in the present disclosure. For the memory-sensitive instruction, only when the instruction is located at the top of a queue in the ROB (the instruction is the oldest instruction in the ROB, and all preceding instructions have been executed completely), its status is updated. This means that all subsequent instructions dependent on this instruction cannot be executed, until the conditional branch outcome of this instruction is determined.

When the instruction is located at the top of the ROB, it indicates that all preceding instructions, including all possible conditional branch determinations, have been executed completely. By this time, an execution status of a branch of the memory-sensitive instruction has been determined. There are no other instructions dependent on a result of the instruction under the speculative execution.

Through the data marking (PTE marking and instruction marking), and a delayed update mechanism dependent on the data marking, the method ensures that any subsequent instructions dependent on the memory-sensitive instruction are not executed in the speculative execution, thereby preventing the confidential data from being leaked when the conditional branch outcome is unknown, effectively resisting the SCA, improving the security, and minimizing the impact on CPU performance.

In the security calculation method for side channel resistance based on data marking, an operating system (OS) executing the method has the following characteristics:

a page table structure is provided with the flag SF for marking whether the memory block corresponding to the PTE is the sensitive memory block; and the memory-safe function capable of modifying the flag SF is added.

As a key component for managing virtual memories, the page table in the OS is used to maintain a mapping relationship from virtual addresses to physical addresses. There are the page directory, the page table, and the PTE. The PTE is an entry in the page table, and contains mapping information from a virtual page frame to a physical page frame. Each PTE typically corresponds to a specific memory block, and contains information mapped to a corresponding memory block of the physical memory. The PTE typically includes a plurality of data bits. For example, in the X86 architecture, the PTE is usually 32-bit or 64-bit. The present disclosure redesigns the page table structure of the OS, and makes use of one or more bits to mark whether the memory block corresponding to the PTE is the data-sensitive memory block. For example, the 1-bit flag SF is added to the PTE, so as to mark whether the memory block corresponding to the PTE is the data-sensitive memory block. SF=1 indicates the data-sensitive memory page, while SF=0 indicates the non-data-sensitive memory page. Certainly, the reverse is also applicable in use.

In the security calculation method for side channel resistance based on data marking, the memory-safe function call is written into an application (App) by an App developer.

The App developer designs corresponding variables for various data in the program, including a corresponding variable for the confidential data. When the program runs, the variable is mapped to some memory block (memory page). An address of the variable is a position of the memory block.

The address of the variable corresponding to the confidential data in the App is taken as the pass parameter and added to the memory-safe function call. When the App runs, the OS executes the memory-safe function in response to the call of the App. The OS knows the memory block of the confidential data according to the pass parameter, thereby modifying the flag SF of the PTE corresponding to the memory block to mark whether the corresponding memory block is the sensitive memory block.

In use, by updating the OS as the modified OS, and downloading the App into which the memory-safe function call is written and in which the call carries the pass parameter including the address of the variable containing the confidential data, the security calculation for side channel resistance can be executed. Certainly, the above use is based on extensive commercial use. The present disclosure is not limited to the extensive commercial use, and protects a case where the security calculation method for side channel resistance is realized by modifying the OS and adding the memory-safe function call to the App.

The method makes use of optimization characteristics including speculative execution, out-of-order execution, and buffer optimization for calculation.

In the security calculation method for side channel resistance based on data marking, during a running process of the App, the PTE is buffered to a data translation look-aside buffer (DTLB) in a CPU core, realizing conversion between a virtual address and a physical address in memory access; and on a CPU instruction pipeline, after each instruction enters an issue queue (IQ), a real-time execution status is synchronously recorded in the ROB.

In the security calculation method for side channel resistance based on data marking, in the ROB, each row records tracking information of one instruction, and pipeline instructions are ordered logically according to a first-in-first-out (FIFO) queue. For example, the oldest instruction is located at the top, while the newest instruction is located at the bottom; and whether the instruction is the oldest instruction in the ROB is determined through a logical order.

In the security calculation method for side channel resistance based on data marking, the CPU core executing the method has the following characteristics:

the ROB is provided with a flag NS for marking whether an instruction is a sensitive instruction, and the ROB is provided with a hardware mechanism with delayed notification; and when the instruction is executed, a target address of the instruction is converted into a physical address through the DTLB, and whether a page of the physical address is marked as the sensitive memory block is determined. If yes, the instruction is marked as the memory-sensitive instruction in the ROB with the flag NS.

In the security calculation method for side channel resistance based on data marking, when an instruction not marked as the memory-sensitive instruction is executed completely, regardless of whether the instruction is the oldest instruction in the ROB, a complete status is updated to the scoreboard according to a preset configuration (for example, the complete status is immediately updated to the scoreboard).

A security calculation system for side channel resistance based on data marking includes a CPU core with optimization characteristics including speculative execution, out-of-order execution, and buffer optimization, and an OS, where a page table structure of the OS is provided with a flag SF for marking whether a memory block corresponding to a PTE is a sensitive memory block and a memory-safe function capable of modifying the flag SF;

when an App runs, the OS executes the memory-safe function in response to a memory-safe function call carrying a pass parameter in the App, and the memory-safe function modifies the flag SF according to the pass parameter to mark whether a corresponding memory block is the sensitive memory block;

an ROB of the CPU core is provided with a flag NS for marking whether an instruction is a sensitive instruction, and the ROB is provided with a hardware mechanism with delayed notification;

when an instruction of the APP is executed, whether a page of a target address of the instruction is marked as the sensitive memory block is determined; and if yes, the corresponding instruction is marked as the memory-sensitive instruction in the ROB with the flag NS; and when the memory-sensitive instruction is executed completely, a complete status is not updated to a scoreboard, until the instruction is an oldest instruction in the ROB.

In the security calculation system for side channel resistance based on data marking, after the APP starts running, the PTE is buffered to a DTLB in the CPU core, realizing conversion between a virtual address and a physical address in memory access; and when the instruction is executed, a target address of the instruction is converted into a physical address through the DTLB, and whether a page of the physical address is marked as the sensitive memory block is determined; and if yes, the instruction is marked as the memory-sensitive instruction in the ROB with the flag NS.

In the security calculation system for side channel resistance based on data marking, the memory-safe function call added to the OS is written into the App, and the call carries the pass parameter; the pass parameter includes an address of a variable containing confidential data, such that the OS executes the memory-safe function by running the App and modifies the flag SF according to the pass parameter, thereby marking whether a corresponding memory block is the sensitive memory block.

The present disclosure has following advantages:
1. The implementation cost is low. The present disclosure only performs lightweight extension on hardware and software structures of the ordinary computer system. Specifically, the PTE flag and the marking function are extended in the OS, and the security flag and the delayed notification mechanism of the ROB are extended in the hardware CPU microarchitecture. Therefore, the present disclosure does not involve major system architecture restructuring, and achieves the low implementation cost.
2. The operation is simple. The memory-safe function call is added to the App. A position of the confidential data in the App is identified. The address of the variable corresponding to the sensitive data is taken as the pass parameter, and added to the memory-safe function call, such that when the memory-safe function is called, the pass parameter is transferred to the memory-safe function. Without complex code modification or system reconstruction, the operation on the App is the same as the operation on the common program normally.
3. The calculated performance and the security are considered. The present disclosure only marks and processes the sensitive memory block and the associated operating instruction (the workload is not increased intrinsically during processing), without affecting most of other operations. While effectively preventing the SCA, the present disclosure has minimal and acceptable impact on the calculated performance.

DETAILED DESCRIPTION OF THE EMBODIMENTS

The present disclosure will be further described in detail below with reference to the accompanying drawings and specific implementations.

Figure 1:
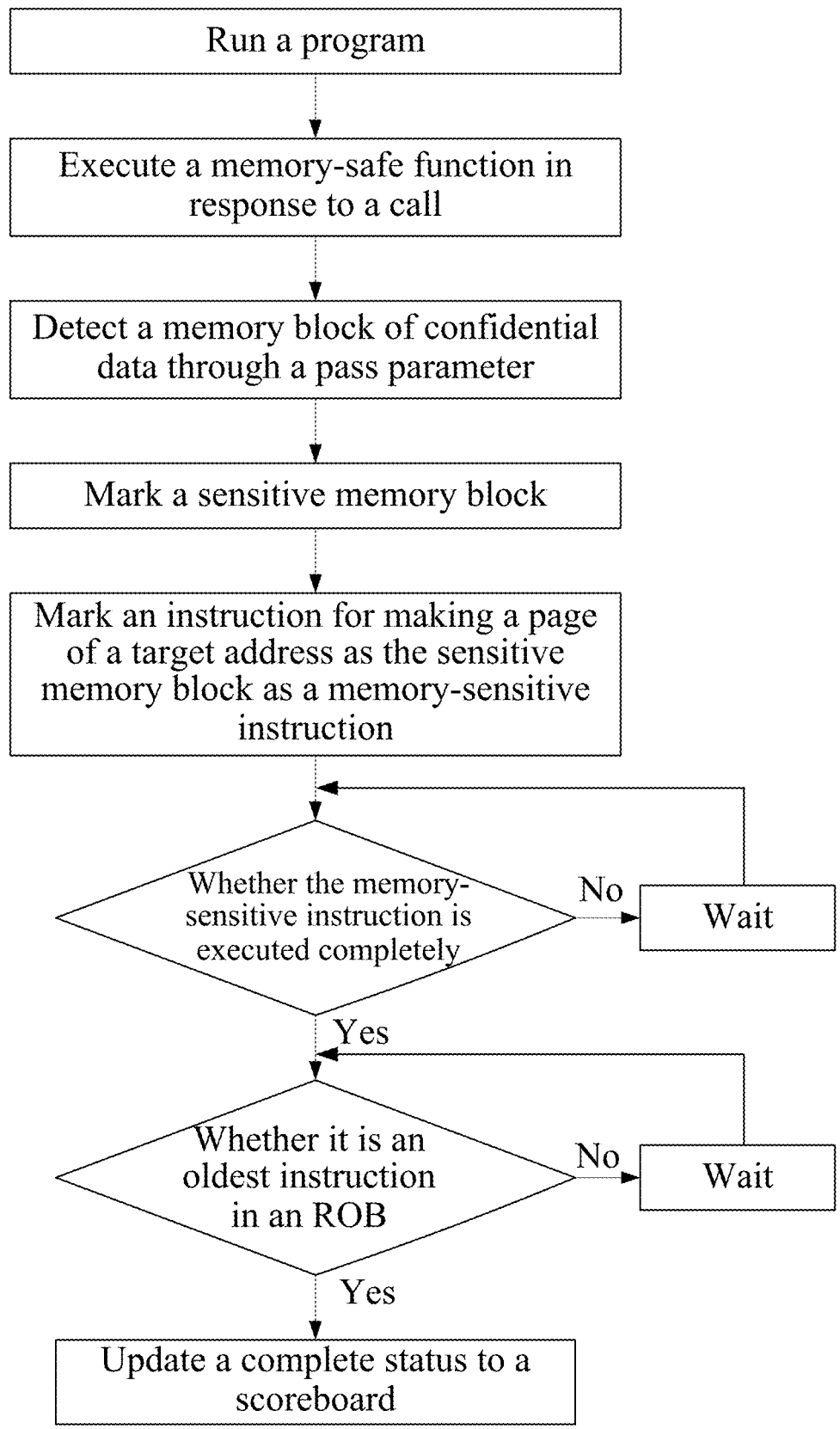
FIG. 1 is a flowchart of a security calculation method for side channel resistance based on data marking according to the present disclosure.

As shown in FIG. 1, the present disclosure provides a security calculation method for side channel resistance based on data marking, including the following steps.

A page table structure of an OS is redesigned. A 1-bit flag SF (certainly, this flag may also be composed of two bits or even more bits) is added to a PTE, so as to mark whether a memory block corresponding to the PET is a data-sensitive memory block. In the embodiment, SF=1 indicates a data-sensitive memory page, while SF=0 indicates a non-data-sensitive memory page. The reverse is also applicable in use. When the flag is composed of a plurality of bits, other forms may be used. Nevertheless, one bit can meet the requirement of the present disclosure.

A memory-safe function msecure_area is added to the OS. Through the memory-safe function, the PTE is modified. When the msecure_area is executed, the SF of the corresponding PTE is updated according a specified memory block called through the msecure_area and an SF value (0 or 1).

Various variables are designed by the App designer forehand in a program to store confidential data. When the program runs, the variable is mapped to some memory block (memory page). An address of the variable is a position of the block. In the present disclosure, a few change is made on the App. That is, a call capable of calling the msecure_area function of the OS is written into the App. An address of a variable containing the confidential data is taken as a pass parameter and added to the function call, such that when the function is called, the pass parameter is transferred to the function, allowing the OS in running to detect that the memory block behind the variable is sensitive and then marks the memory block.

The App is started. As the program runs, the PTE is buffered to a DTLB in a CPU core, realizing conversion between a virtual address and a physical address in memory access.

On a CPU instruction pipeline, after each instruction enters an IQ, its real-time execution status is synchronously recorded in an ROB for tracking and management. In the ROB, each row records tracking information of one instruction, and pipeline instructions are ordered logically according to an FIFO queue. In the embodiment, the oldest instruction is located at the top, while the newest instruction is located at the bottom, which is not limited in use.

Further, a flag NS is added to the ROB in the present disclosure, so as to mark whether a Load instruction is a memory-sensitive instruction (NS=1). Likewise, in the embodiment, NS=1 indicates the memory-sensitive instruction, while NS=0 indicates a non-memory-sensitive instruction. The reverse is also applicable in use.

When the Load instruction is executed, a target address (virtual address) of the Load is converted into a physical address through the DTLB. By this time, if a page of the target address is marked as the sensitive memory page (SF=1), namely the sensitive memory block, the Load instruction is marked as the memory-sensitive instruction (NS=1) in the ROB.

Normally, when one Load instruction, such as Load(a), is executed completely, its status is marked as being complete in the ROB, and immediately notified to a scoreboard. The scoreboard is used to realize efficient out-of-order execution of instructions. Upon receiving status update of the ROB, it analyzes dependency relationships between the instructions, and dispatches all other subsequent instructions dependent on the Load(a) instruction from the IQ for execution.

In the present disclosure, a status update mechanism of the ROB is modified. If the Load(a) is marked as the memory-sensitive instruction (NS=1), when the instruction is executed completely, its complete status is not immediately updated to the scoreboard, until the Load(a) is located at the top of the queue in the ROB, namely the Load(a) is the oldest instruction in the ROB. When the Load(a) is located at the top in the ROB, it indicates that all preceding conditional determination instructions in the branch have been executed. By this time, any subsequent instructions dependent on the Load(a) are no longer speculative execution instructions, and thus their operations on sensitive data are secure.

Figure 2:
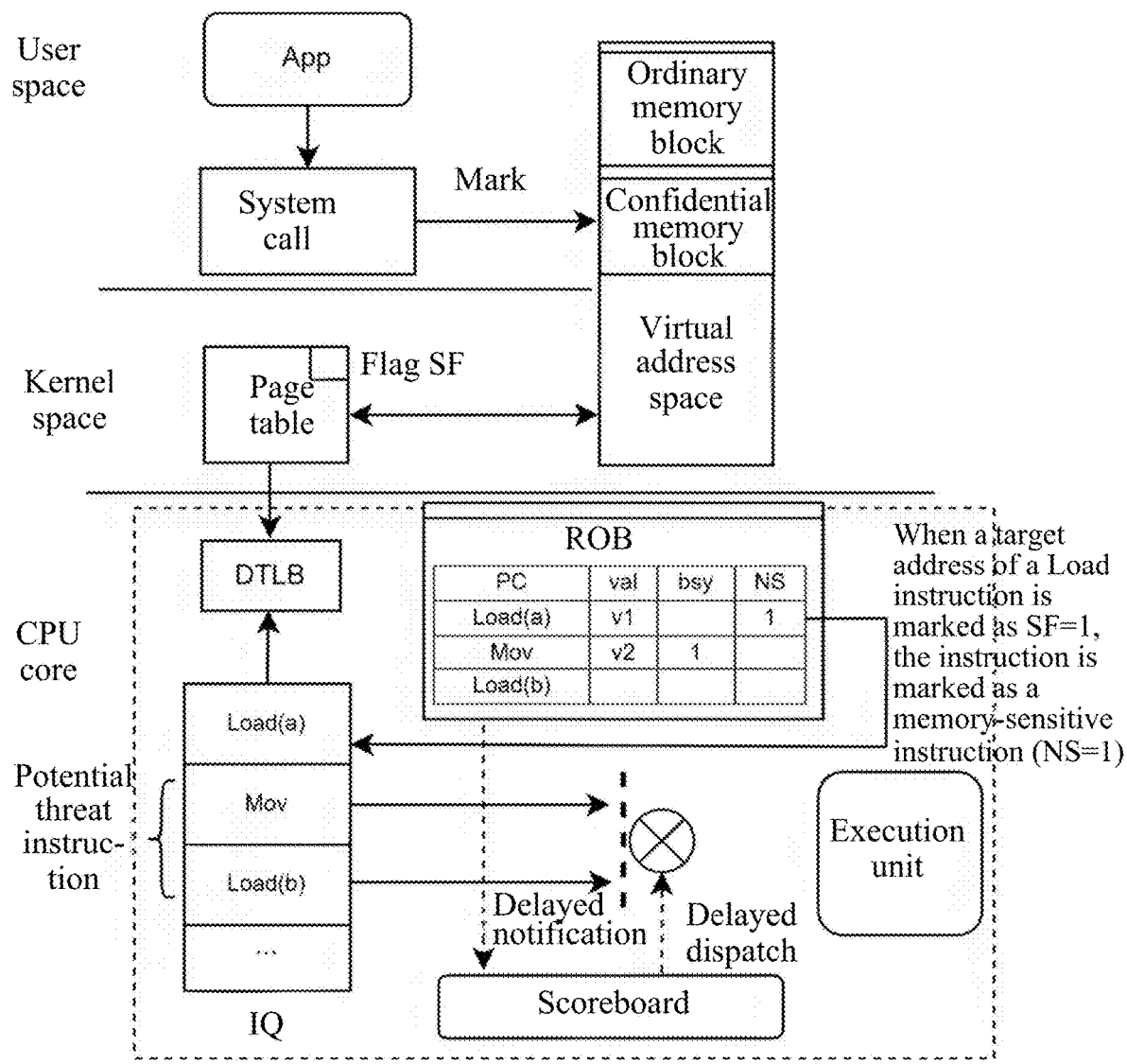
FIG. 2 is an architectural diagram of a security calculation system for side channel resistance based on data marking according to the present disclosure.

As shown in FIG. 2, a security calculation system for side channel resistance based on data marking provided by the present disclosure includes a software module and a hardware module.

The software module includes an App and a security-enhanced OS.

The App is provided by the user. Before execution, a system method msecure_area is called, and a memory block of confidential data is marked as a sensitive memory.

The security-enhanced OS supports an SF-marked page table structure, and provides a memory-safe function msecure_area, so as to mark an SF in a specified PTE according to a user parameter.

The hardware module includes a security-enhanced CPU core, a memory, a storage device, an input/output (I/O) device, etc.

Like the ordinary CPU core, the security-enhanced CPU core also possesses various optimization characteristics of the modern computer CPU, including branch prediction, out-of-order execution, DTLB, etc. Besides, the security-enhanced CPU core supports an ROB with an NS marking function. In response to SF=1 in a target address of the Load instruction, the ROB adds NS=1 in tracking information of the instruction. In addition, the ROB in the present disclosure provides a hardware mechanism with delayed notification. For an ordinary ROB, after the Load instruction is executed completely, its status is immediately notified to a scoreboard. In the security-enhanced ROB, the status notification is delayed, until the Load instruction is located at the top of a queue in the ROB. By this time, it indicates that conditional determination instructions on the whole branch have been executed completely (submitted and retired), subsequent potential threat instructions are not subjected to speculative execution, and thus are securely executed within a security boundary.

To make readers better understand the present disclosure, an application scenario of a bank transaction system is described hereinafter:

In the bank system, it is essential to strictly protect sensitive information (including an account password, a transaction amount, and a personal information) of the user. The information is processed and stored in transaction of the user. Any leakage of the information may incur serious security issues and economic losses. In response to use of the present disclosure, according to the system provided by the present disclosure, the memory-safe function is added to the OS. Meanwhile, the flag SF used for marking whether a memory block corresponding to a PTE is a sensitive memory block and capable of being modified by the memory-safe function is provided in the page table structure. The flag NS for marking whether an instruction is a sensitive instruction is designed in the ROB of the CPU core. The ROB is provided with the hardware mechanism with the delayed notification.

A memory function call added by the developer in advance and used to call the memory-safe function of the OS is downloaded and installed in the system. A pass parameter in the memory-safe function call includes running transaction software, called an App for short, for an address of a variable (such as a variable for allowing the user to input a password) carrying confidential data. When the App runs, the OS and the hardware work collaboratively. The OS executes the msecure_area function in response to a call of the App, detects a memory block of the confidential data according to a call parameter, and marks the memory block with the flag SF. In response to a login or transfer operation of the user, the CPU core detects that a page of a target address of the instruction is marked as the sensitive memory page, and thus marks the instruction as the memory-sensitive instruction. After the instruction is executed completely, a complete status is not updated to the scoreboard, until the instruction is the oldest instruction in the ROB. This can ensure that subsequent instructions of the login or transfer operation can only be executed after a conditional branch is determined, thereby preventing the sensitive data and the confidential data from being leaked when the conditional branch outcome is unknown, effectively resisting the SCA, improving the security, and minimizing the impact on CPU performance.

The specific example described in the embodiment is merely intended to illustrate the spirit of the present disclosure. A person skilled in the art can make various modifications or supplements to the specific embodiments described or replace them in a similar manner, but it may not depart from the spirit of the present disclosure or the scope defined by the appended claims.

The invention claimed is:

1. A security calculation method for side channel resistance based on data marking, comprising:
   executing a memory-safe function in response to a memory-safe function call carrying a pass parameter, wherein the pass parameter comprises an address of a variable containing confidential data;
   marking, according to the pass parameter with a first flag of a page table entry (PTE) corresponding to a memory block, the corresponding memory block as a sensitive memory block;
   marking an instruction for marking a page of a target address as the sensitive memory block as a memory-sensitive instruction in a reorder buffer (ROB); and
   when the memory-sensitive instruction is executed completely and is an oldest instruction in the ROB, updating a complete status to a scoreboard, ensuring that a subsequent potential threat instruction is not subjected to speculative execution;
   wherein for an operating system (OS) executing the security calculation method, a page table structure is provided with the first flag for marking whether the memory block corresponding to the PTE is the sensitive memory block;
   the memory-safe function configured to modify the first flag is added;
   for a central processing unit (CPU) core executing the security calculation method, the ROB is provided with a second flag for marking whether an instruction is a sensitive instruction, and the ROB is provided with a hardware mechanism with delayed notification;
   the memory-safe function call is written into an application (App); and
   the address of the variable corresponding to the confidential data in the App is taken as the pass parameter and added to the memory-safe function call, wherein when the App runs, the memory-safe function is executed in response to the memory-safe function call, thereby modifying the first flag according to the pass parameter to mark whether the corresponding memory block is the sensitive memory block.

2. The security calculation method for side channel resistance based on data marking according to claim 1, wherein the security calculation method makes use of optimization characteristics comprising speculative execution, out-of-order execution, and buffer optimization for calculation.

3. The security calculation method for side channel resistance based on data marking according to claim 2, wherein
during a running process of the App, the PTE is buffered to a data translation look-aside buffer (DTLB) in the CPU core, realizing conversion between a virtual address and a physical address in memory access; and
on a CPU instruction pipeline, after each instruction enters an issue queue (IQ), a real-time execution status is synchronously recorded in the ROB.

4. The security calculation method for side channel resistance based on data marking according to claim 2, wherein
when the instruction is executed, a target address of the instruction is converted into a physical address through a DTLB, and whether a page of the physical address is marked as the sensitive memory block is determined; and if yes, the instruction is marked as the memory-sensitive instruction in the ROB with the second flag.

5. The security calculation method for side channel resistance based on data marking according to claim 1, wherein
during a running process of the App, the PTE is buffered to a data translation look-aside buffer (DTLB) in the CPU core, realizing conversion between a virtual address and a physical address in memory access; and
on a CPU instruction pipeline, after each instruction enters an issue queue (IQ), a real-time execution status is synchronously recorded in the ROB.

6. The security calculation method for side channel resistance based on data marking according to claim 5, wherein
in the ROB, each row records tracking information of one instruction, and pipeline instructions are ordered logically according to a first-in-first-out (FIFO) queue; and
whether the instruction is the oldest instruction in the ROB is determined through a logical order.

7. The security calculation method for side channel resistance based on data marking according to claim 1, wherein
when the instruction is executed, a target address of the instruction is converted into a physical address through a DTLB, and whether a page of the physical address is marked as the sensitive memory block is determined; and if yes, the instruction is marked as the memory-sensitive instruction in the ROB with the second flag.

8. The security calculation method for side channel resistance based on data marking according to claim 1, wherein
when an instruction not marked as the memory-sensitive instruction is executed completely, regardless of whether the instruction is the oldest instruction in the ROB, a complete status is updated to the scoreboard according to a preset configuration.

9. The security calculation method for side channel resistance based on data marking according to claim 1, wherein
during a running process of the App, the PTE is buffered to a data translation look-aside buffer (DTLB) in the CPU core, realizing conversion between a virtual address and a physical address in memory access; and
on a CPU instruction pipeline, after each instruction enters an issue queue (IQ), a real-time execution status is synchronously recorded in the ROB.

10. The security calculation method for side channel resistance based on data marking according to claim 1, wherein
when the instruction is executed, a target address of the instruction is converted into a physical address through a DTLB, and whether a page of the physical address is marked as the sensitive memory block is determined; and if yes, the instruction is marked as the memory-sensitive instruction in the ROB with the second flag.

11. A security calculation system for side channel resistance based on data marking, comprising:
a central processing unit (CPU) core with optimization characteristics comprising speculative execution, out-of-order execution, and buffer optimization, and
an operating system (OS);
wherein a page table structure of the OS is provided with a first flag for marking whether a memory block corresponding to a page table entry (PTE) is a sensitive memory block and a memory-safe function configured to modify the first flag;
an application (App) comprises a memory-safe function call written into it;
an address of a variable corresponding to confidential data in the App is taken as a pass parameter and added to the memory-safe function call;
when the App runs, the memory-safe function is executed in response to the memory-safe function call carrying the pass parameter, and the first flag is modified according to the pass parameter to mark whether a corresponding memory block is the sensitive memory block;
a reorder buffer (ROB) of the CPU core is provided with a second flag for marking whether an instruction is a sensitive instruction, and the ROB is provided with a hardware mechanism with delayed notification;
when an instruction of the App is executed, whether a page of a target address of the instruction is marked as the sensitive memory block is determined; and if yes, the corresponding instruction is marked as the memory-sensitive instruction in the ROB with the second flag; and
when the memory-sensitive instruction is executed completely, a complete status is not updated to a scoreboard, until the instruction is an oldest instruction in the ROB.

12. The security calculation system for side channel resistance based on data marking according to claim 11, wherein after the App starts running, the PTE is buffered to a data translation look-aside buffer (DTLB) in the CPU core, realizing conversion between a virtual address and a physical address in memory access; and
when the instruction is executed, the target address of the instruction is converted into the physical address through the DTLB, and whether a page of the physical address is marked as the sensitive memory block is determined; and if yes, the instruction is marked as the memory-sensitive instruction in the ROB with the second flag.

13. The security calculation system for side channel resistance based on data marking according to claim 11, wherein the OS executes the memory-safe function by running the App and modifies the first flag according to the pass parameter, thereby marking whether the corresponding memory block is the sensitive memory block.

* * * * *